(12) United States Patent
Rabinovich et al.

(10) Patent No.: US 9,177,226 B2
(45) Date of Patent: Nov. 3, 2015

(54) OBJECT DETECTION IN IMAGES BASED ON AFFINITY DETERMINATIONS

(71) Applicant: Google Inc., Mountain View, CA (US)

(72) Inventors: Andrew Rabinovich, San Diego, CA (US); Dragomir Anguelov, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 66 days.

(21) Appl. No.: 14/204,407

(22) Filed: Mar. 11, 2014

(65) Prior Publication Data

US 2015/0169998 A1   Jun. 18, 2015

Related U.S. Application Data

(60) Provisional application No. 61/789,648, filed on Mar. 15, 2013.

(51) Int. Cl.
  *G06K 9/62* (2006.01)
  *G06K 9/66* (2006.01)

(52) U.S. Cl.
  CPC ............ *G06K 9/6218* (2013.01); *G06K 9/6219* (2013.01); *G06K 9/6267* (2013.01); *G06K 9/66* (2013.01)

(58) Field of Classification Search
  None
  See application file for complete search history.

(56) References Cited

U.S. PATENT DOCUMENTS

| | | | |
|---|---|---|---|
| 6,721,449 B1 * | 4/2004 | Krishnamachari | 382/165 |
| 8,352,465 B1 * | 1/2013 | Jing et al. | 707/723 |
| 8,442,321 B1 * | 5/2013 | Chang et al. | 382/181 |
| 8,909,563 B1 * | 12/2014 | Jing et al. | 706/12 |
| 9,025,811 B1 * | 5/2015 | Ioffe et al. | 382/100 |
| 2002/0168108 A1 * | 11/2002 | Loui et al. | 382/190 |
| 2005/0002568 A1 * | 1/2005 | Chupeau et al. | 382/190 |
| 2005/0058339 A1 * | 3/2005 | Kato et al. | 382/159 |
| 2006/0023947 A1 * | 2/2006 | Rising | 382/190 |
| 2007/0203942 A1 * | 8/2007 | Hua et al. | 707/104.1 |
| 2008/0037877 A1 * | 2/2008 | Jia et al. | 382/224 |
| 2010/0142832 A1 * | 6/2010 | Nafarieh et al. | 382/218 |
| 2010/0232686 A1 * | 9/2010 | Dewan et al. | 382/159 |
| 2011/0255748 A1 * | 10/2011 | Komoto et al. | 382/103 |
| 2013/0148880 A1 * | 6/2013 | Kennedy et al. | 382/159 |

FOREIGN PATENT DOCUMENTS

WO   WO 9967695 A2 * 12/1999

OTHER PUBLICATIONS

Cho, Minsu, Jungmin Lee, and Jungmin Lee. "Feature correspondence and deformable object matching via agglomerative correspondence clustering." Computer Vision, 2009 IEEE 12th International Conference on. IEEE, 2009.*

(Continued)

*Primary Examiner* — Utpal Shah
*Assistant Examiner* — Narek Zohrabyan
(74) *Attorney, Agent, or Firm* — Fish & Richardson P.C.

(57) ABSTRACT

A hierarchy of clusters is determined, where each leave of the hierarchy corresponds to one of the images in a group, and each cluster in the hierarchy identifies images in the group that are deemed similar to one another. The hierarchy identifies a similarity between each of the plurality of clusters.

18 Claims, 7 Drawing Sheets

(56) References Cited

OTHER PUBLICATIONS

Pandey, Megha, and Svetlana Lazebnik. "Scene recognition and weakly supervised object localization with deformable part-based models." Computer Vision (ICCV), 2011 IEEE International Conference on. IEEE, 2011.*

Natsev, Apostol, Rajeev Rastogi, and Kyuseok Shim. "Walrus: A similarity retrieval algorithm for image databases." Knowledge and Data Engineering, IEEE Transactions on 16.3 (2004): 301-316.*

Felzenszwalb et al., "Object Detection with Discriminatively Trained Part Based Models," Pattern Analysis and Machine Intelligence, IEEE Transactions, vol. 32, Issue 9, Sep. 2010, 20 pages.

Divvala et al., "How Important are 'Deformable Parts' in the Deformable Parts Model?". Proceedings of ECCV 2012, Florence, Italy, Oct. 2012, 15 pages.

* cited by examiner

OBJECT DETECTION IN IMAGES BASED ON AFFINITY DETERMINATIONS

CROSS-REFERENCE TO RELATED APPLICATIONS

This application claims the benefit under 35 U.S.C. §119(e) of the filing date of U.S. Provisional Patent Application No. 61/789,648, filed on Mar. 15, 2013, entitled "Object Detection In Images Based On Affinity Determinations," the entirety of which is herein incorporated by reference.

BACKGROUND

Search systems currently exist for identifying images and image content in response to user queries. In particular, image search systems exist for responding to text-based queries, as well as to image-based queries. Image-based queries can process image data, such as a Joint Photographic Expert Group ("JPEG") file, as input. The search result for such image-based queries can include images or image content that are deemed similar in visual appearance to the query image.

Search systems that perform image similarity have applications for image search and retrieval. Under many conventional approaches, image similarity operations use histograms of color and/or texture, and then combine the histograms with weights that are learned through training.

SUMMARY

Examples described herein provide a system or method for determining similarity amongst images. According to one aspect, a first image is partitioned into a plurality of parts, and an affinity is determined between each part of the first image and each of multiple parts of each sample in a set of samples. A maximum affinity is determined for each part of the first image and each sample in the set. The maximum affinity for each part of the first image and each sample in the set is based on a distance measure as between that part of the first image and a part of the sample which has the highest affinity to that part of the first image. An affinity is determined between the first image and each sample in the set based on a maximum affinity of each part of the first image with that sample. A sample is selected from the set that has a highest affinity to the first image. An object value is determined for an object depicted in the first image based on the selected sample.

According to an aspect, the first image is partitioned by determining a bounding box for the first image, and then partitioning a portion of the first image within the bounding box.

Still further, an affinity between each part of the first image and each of multiple parts of each sample in the set may be determined using a histogram of gradient (HOG). The HOG may be determined for each part of the first image and each part of each sample in the set.

In a variation, an affinity between each part of the first image and each of multiple parts of each sample in the set includes is determined from a distance measure between each part of the first image and each of the multiple parts of each of the samples in the set.

In one implementation, the distance function may be determined from a Euclidean distance function between each part of the first image and each of the multiple parts of each sample in the set.

According to another aspect, image recognition is performed on the first image to determine recognition information. The recognition information and the object value are as part of a search criterion in performing a search operation.

According to another aspect, the object value identifies a subclass and a perspective for a class of object.

According to another aspect, a similarity is determined between each image in a collection of images with every other image of the collection. The images of the collection can be aggregated into a plurality of clusters, based at least in part on the similarity between each image in the collection and every other image of the collection. Each of the plurality of clusters can be assigned to a category for a class of objects.

In a variation, the images of the collection are aggregated into the plurality of clusters in a manner that is inversely proportional to a generalization error.

In one variation, the number of clusters that are identified are optimized based on the generalization error.

According to another aspect, each image is partitioned into a plurality of parts, and each part of multiple parts for each image is compared with a set of multiple parts of at least some of the images in the collection.

In on implementation, a distance measure is determined as between each part of multiple parts for each image and the set of multiple parts for every other image of at least some of the images.

In a variation, the similarity can be determined from an affinity matrix that identifies a similarity between each image in the collection and every other image of the collection.

In still another implementation, a hierarchy of clusters is determined, where each leave of the hierarchy corresponds to one of the images in a group, and each cluster in the hierarchy identifies images in the group that are deemed similar to one another. The hierarchy identifies a similarity between each of the plurality of clusters.

Still further, examples described herein can be implemented as a non-transitory computer readable medium that stores instructions for determining similarity amongst images. The stored instructions can be executable by one or more processors to cause the one or more processors to perform operations as described by various examples.

DETAILED DESCRIPTION

Figure 1:
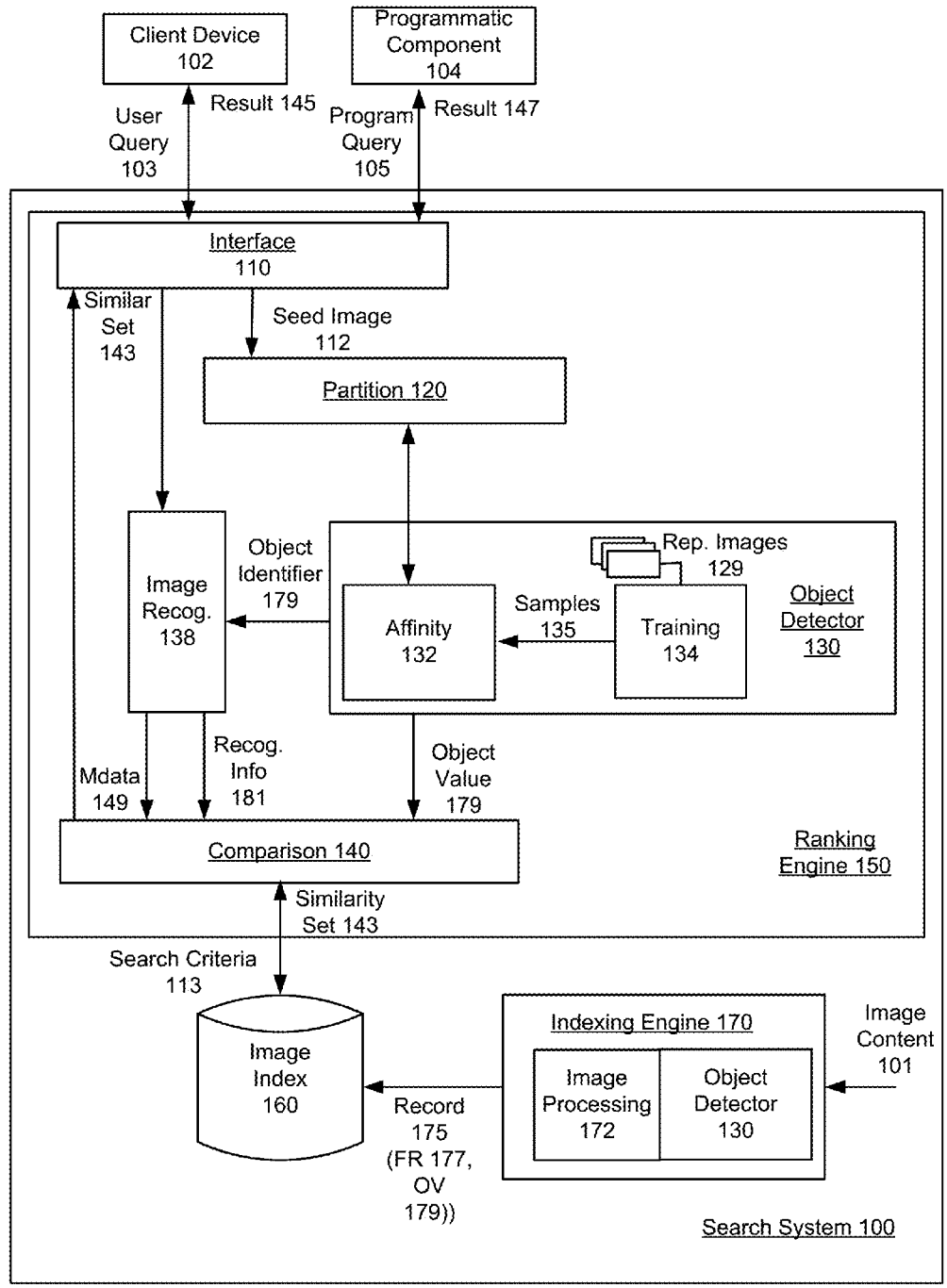
FIG. 1 illustrates a search system for performing image similarity operations, according to an aspect.

FIG. 1 illustrates an example search system for performing image similarity operations. A search system 100 such as described by FIG. 1 can be implemented for a variety of applications, including image and video searching. The search system 100 can be implemented on a computer, or a combination of computers that communicate, for example, through a network. The search system 100 can receive queries 103 from end user devices, represented in FIG. 1 by client device 102. The client devices 102 can include, for example, a desktop computer, a portable computing device such as a laptop or tablet, or a mobile computing device.

Each client device 102 can be operated to submit a query to the search system 100. Each query 103 can correspond to a request for information. In some implementations, each query 103 specifies an image as input. For example, each query 103 can include image data, or include data that specifies an image file or content. In some implementations, the query 103 can be accompanied by other forms of input, such as text input or audio input. In one example, the search system 100 and the client device 102 can communicate though a network, or a combination of networks, such as through an intranet and/or the Internet. While the search system 100 and the client device 102 are shown to be on separate devices, in some variations the search system 100 and the client device 102 can be on a same device.

In one implementation, system 100 includes a ranking engine 150, an image index 160, and an indexing engine 170. The indexing engine 170 maintains the image index 160 for use by the search system 100. In examples described herein, the indexing engine 170 can process, for example, image content, and documents or resources that contain image content, in order to create and update records that reference images or documents that contain images. The indexing engine 170 can implement crawlers, spiders or other programmatic mechanisms to retrieve documents and content resources over the Internet. The documents and content resources can be parsed to identify, for example, image or video files.

The image index 160 stores index information provided from the indexing engine 170. The index information can include records 175, representing entries of, for example, image files, video files, and documents or content resources that include or provide image or video files. In one implementation, the image index 160 can store location information and identifiers for the images, in association with quantitative representations of the individual images and classifications determined for the images. The image index 160 can also store copies of the images, such as a thumbnail or reduced copy of the original image. Still further, the image index 160 can store information such as metadata or text that is provided with the individual image.

According to some implementations, the ranking engine 150 includes an interface 110, a partition component 120, an object detector 130, an image recognition component 138, and a comparison component 140. In one aspect, the interface 110 receives the user query 103 from the client device 102. The user query 103 can include an image file that the user uploads. Alternatively, the user query 103 can specify an image. As an example, an image for the user query 103 can be selected or specified by the user operating a browser or image/video rendering application on the client device 102. As another example, the user query 103 can correspond to video input selected by the user operating a video rendering or editing application on the client device 102. In some aspects, the query 103 includes only the image, without metadata or contextual information relating to the subject of the image specified by the query 103.

As an alternative or in addition, the interface 110 is able to receive programmatic queries 105 from a programmatic component 104. The programmatic component 104 can correspond to a program that operates to select images and image content for search and/or retrieval operations. For example, programmatic component 104 can correspond to a script or process that executes to parse web pages and resources in identifying image or video content.

The interface 110 is configured to process queries 103, 105 to determine a seed image 112. The seed image 112 can correspond to, for example, an image file that is included in the query 103, 105, or an image file that is specified by location in the query 103, 105. If the query 103, 105 specifies the seed image, the interface 110 can retrieve the image based on the data included in the respective query.

In some variations, metadata and contextual information can be used in processing the search query 103, 105. For example, the interface 110 can include functionality for parsing or extracting text, metadata, and other information provided with the seed image 112. Additionally, the interface 110 can operate to extract metadata such as tags provided with the user query 103. In variations, the interface 110 can extract text and other information or data from a web page, in connection with locating an embedded image for use in performing image similarity operations. As another addition or variation, the interface 110 can determine contextual information with the respective search query 103, 105. As described below, some variations provide for use of text, metadata, content and/or other contextual information in order to determine semantic classifications for the seed image 112.

According to one aspect, the partition component 120 identifies a bounding box for the seed image 112, and generates multiple partitions within the bounding box. As used herein, a bounding box refers to a region of an image that is selected to be a focus of analysis when performing functions such as determining distance measures and feature vectors. Generally, a bounding box occupies a central or majority region of an image.

According to an aspect, the object detector 130 performs object detection using any one of a variety of object detection processes. In one implementation, a deformable part model analysis is used in which the sample image is compared to templates for purpose of determining an object of a particular type or sub-category. As described below, in the deformable parts analysis, the parts of the partitioned seed image 115 are individually compared to a range of parts for individual samples of a given model.

As an alternative or in addition, the object detector 130 utilizes a training set that is determined from programmatically aggregating a library of sample images into clusters. By way of example, each cluster can correspond to a sub-category and/or perspective, with each image in the cluster having visual similarity to one another, while each cluster is visually discernible from other clusters. Accordingly, as part of clustering the images, an affinity based analysis may be developed, so that the clusters are determined from visual similarity. In one implementation, the clustering used to determine the training sets may be based on a deformable parts model analysis. The clusters identified from a given collection can in turn provide templates for object detection.

In some examples, object detector 130 can process the partitioned seed image 115 to detect particular kinds of objects from image content. The object detector 130 can be trained to detect multiple kinds of objects. In particular, different training and samples can be used for detecting different subclasses of a particular object class. In an example, object detector 130 includes detection logic that utilizes any one of multiple possible samples to analyze an image, and identify a given kind of object by class and subclass within the image. The samples 135 may be partitioned. According to one aspect, a given object or object type may be represented by a set of multiple images, representing different viewpoints of the particular object or object type. For example, in the category space of vehicles, the set of samples can account for vehicle type and perspectives for each vehicle type. If there is assumed to be eight vehicle types, and six common perspectives for images that depict vehicles, then there may exist 48 sets of samples, and each sample set can correspond to one or more samples. The individual samples 135 can represent, for example, images of a class or subclass of objects. The samples 135 can be represented as images or as quantitative representation of images, and further include partitions based on designated bounding box regions.

The detection component 132 can include affinity logic 132 which compares the seed image with samples 135. In one implementation, the affinity logic 132 utilizes deformable parts model (DPM) logic, in which individual parts of the partitioned seed image 115 are compared against parts of partitioned samples 135. The comparison of parts of the seed image to the samples 135 can be based on, for example, a distance measure, such as a Euclidean distance measure. In performing the analysis, the parts can also be subjected to transformations, such as transformations to rotate, warp, resize, translate, or scale the parts that are being compared by way of, for example, distance measures.

In variations, other kinds of affinity based comparisons can be performed. In some variations, comparison rules may be implemented as to which partitions of the seed image and samples can be compared. For example, for a given object type, a part in a lower quadrant of the partitioned seed image 115 may be limited to comparison to parts in samples 135 that are also in a lower quadrant. Alternatively, each part of the partitioned seed image 115 can be compared to each part of each sample 135 in the set of samples for a given model. The affinity logic 132 may compute visual similarity as between the compared parts of the partition seed image and those parts of the samples 135. In one implementation, the affinity logic 132 determines distance measures between each of multiple partitions of the partitioned seed image 115, and multiple partitions in each sample for a given set of samples 135. When the partitioned seed image 115 is matched, the matching sample image identifies the type of object, as well as the perspective, depicted in the partitioned seed image 115.

Various criteria can be implemented in order to determine whether a match is found between the partitioned seed image 115 and one or more of the samples 135. In one implementation, a distance d(i,j) is determined as between the partitioned seed image 115 and each sample 135 in a given model that represents a subclass of objects, where the distance d(i,j) represents a sum of distances between each part in the bounding box of the partitioned seed image 115 and the best matching part of the given sample. In other words, each of the parts of the partitioned seed image 115 is allowed to move a certain distance in relation to the bounding box of a given sample, and the overall affinity between the partitioned seed image 115 and the particular sample 135 is based on the minimum distance score, or conversely the maximum affinity, of each part within the allowed range. The object detection 130 can detect the object(s) in the partitioned seed image based on the sample 135 that has the best score, e.g., greatest affinity. As an alternative or variation, the object detection 130 can detect objects in the partitioned seed image 115 based on distance d(i,j) with any one or more samples 135 satisfying a predefined threshold.

To preserve computation resources and maintain a high degree of results, examples described herein recognize the value in training the object detector 130 for specific subclasses of objects. According to one aspect, object detector 130 includes a training component 134 that implements training algorithms for various sub-groups. The training component 134 can train from representative collection of images 129, and utilize both positive and negative matches to train the detection component 132. In one implementation, object detector 130 is trained by a process that implements deformable parts model with latent Support Vector Machine (SVM). In one implementation, the detection component 132 is trained so as to include samples 135 as templates for specific categories or sub-categories of objects. The identification of the samples 135 may be based on affinity comparison, such as implemented through a deformable parts analysis. Once the samples 135 are identified, samples can be further refined through a discriminative training process that utilizes positive and negative examples. An example of such a training process is described with an example of FIG. 5. A training component 134 can implement, for example, a process such as described with FIG. 5 in order to train the object detector 130.

The object detector 130 can determine an object value 179 from the partitioned seed image 115. The object value 179 can be used in performing additional image analysis, such as provided through image processing 138. The object value 179 can be used to augment or enhance the analysis process performed on the seed image 112. For example, image analysis 138 can generate recognition information 181 utilizes or is otherwise based in part on the object value 179. The recognition information 181 can correspond to a feature vector, histogram, or other value representation of the seed image 112. In an aspect, image recognition information 181 can be made specific for the subclass of object, as specified by the object value 179.

In one implementation, comparison component 140 receives object value 179, as well as additional information such as recognition information 181 and/or metadata 183. The comparison component 140 can generate a criterion 113 that is based on the object value 179, recognition information 181 and/or metadata 149. In one implementation, the comparison component 140 may use the criterion 113 to determine a set of similar images from the image index 160. As described below, the image index may be structured to include various types of information about image content, including feature representations of the image content, as well as identifiers of the objects detected in the individual images of the collection.

According to some aspects, the indexing engine 170 includes crawlers, spiders or other functionality to crawl web pages and resources to detect and analyze image content 101. The indexing engine 170 can also include functionality that analyzes image content 101 from other sources in order to index individual images to include properties that include semantic classification and feature representation of images. Individual images may also be associated with network locations where the full rendition can be found. The indexing engine 170 may also generate a copy or duplicate of the original image to render in connection with a search result. For example, the indexing engine 170 may generate a thumbnail version of an image, and create an index record for the image that includes one or more semantic classifications or category designations for the image, as well as its feature set representation of the image. In this way, system 100 is able to return a search result that includes, for example, a thumbnail or reduced version of the image identified by the indexing engine 170.

According to some aspects, the indexing engine 170 includes an image processing component 172. As an addition or alternative, indexing engine 170 can include object detector 130 to process image content 101. In one implementation, the object detector 130 uses affinity logic 132 to detect objects in the image content 101. The object detector 130 of the indexing engine can be trained using, for example, a process such as described with FIG. 5, to detect objects of specific classes and subclasses.

According to some aspects, the indexing engine 170 includes an image processing component 172, which can utilize logic such as provided by the object detector 130. The indexing engine 170 may store a given record 175 for each individual image. The record 175 can specify a feature representation 177 of the image, as determined by the image processing component 172. The feature representation 177 can include a quantitative representation of a corresponding image. For example, the feature representation 177 can correspond to a vector representation of a corresponding image. Additionally, the record 175 can specify one or more object values 179 contained in the image of the record, based on an output of the object detector 130.

In more detail, some aspects provide that image processing component 172 can operate to process image content 101, including to determine feature sets for images, extract metadata and tags, and extract or process text or contextual information with the individual images. As an example, image processing component 172 can parse web pages and identify embedded images or image content, and extract metadata from the embedded images. In one implementation, the image processing component 172 can also perform image analysis on image content that is extracted from web pages during a web crawling process. For example, the image processing component 172 can determine quantitative representations of images that include color, texture, pattern and/or shape. For example, the image processing component 172 can determine shape or feature vectors, as well as color and texture histograms, for images it identifies and indexes. In this way, the image index 160 can be used to store quantitative representations of images that it indexes.

The comparison component 140 uses the search criterion 113 to identify a similar set of image items 143 from the image index 160. As an addition or variation, the object value 179 can be used to determine the class and subclass of objects contained in images for the seed image 112. The comparator identifies a similar set 143 of images that are visually similar to the seed image 112. The extent of the similarity for the individual items of the similar set 143 may be greater and/or more relevant as compared to more conventional approaches which do not provide for object detection and/or training using a deformable parts model process.

The similar set 143 can correspond to images or documents that contain images. In some implementations, the items of the similar set 143 can be ranked or filtered by the ranking engine 150. Additionally, the ranking engine 150 may calculate scores for the items of the similar set 143 using one or more ranking signals. For image processing, the ranking signals can be based in part or entirely on a measure of similarity between individual items in the similarity set and the seed image 112 of the query 103, 105. For example, the items with more similar image content can be ranked higher or deemed to be more similar. Numerous other signals can also be used in order to rank the items of the similar set 143. For example, the ranking signals can include a parameter that is based on the overall quality of the source for individual items in the similar set 143. As another example, ranking signals can also include, for example, a recency of when the item was updated or created, or a popularity of a source of the item, such as the web page on which the image content was provided. The ranking engine 150 can rank the items of the similar set 143 based on an overall score that accounts for the various ranking signals, including the overall similarity score. In an implementation such as shown by FIG. 1, the similar set 143 is returned to client device 102 or programmatic component 104 as a result 145, 147. The results 145, 147 can include image files or documents containing image content which are responsive to the respective query 103, 105. For example, a result 145 can include a title of a document or image file that is provided as part of the similar set 143, a link to a document or image file, a summary and/or a thumbnail of the image file or content. The result 145 can include multiple entries, representing different items of the similar set 143.

In an implementation in which the system 100 responds to query 105 generated from the programmatic component 104, the result 147 can include, for example, links to enable the programmatic component 105 to render one or more images from the similar set 143. Likewise, the result 147 can include other information, such as a title for the document or image file that is provided as part of the similar set 143.

Example User Interface

Figure 2:
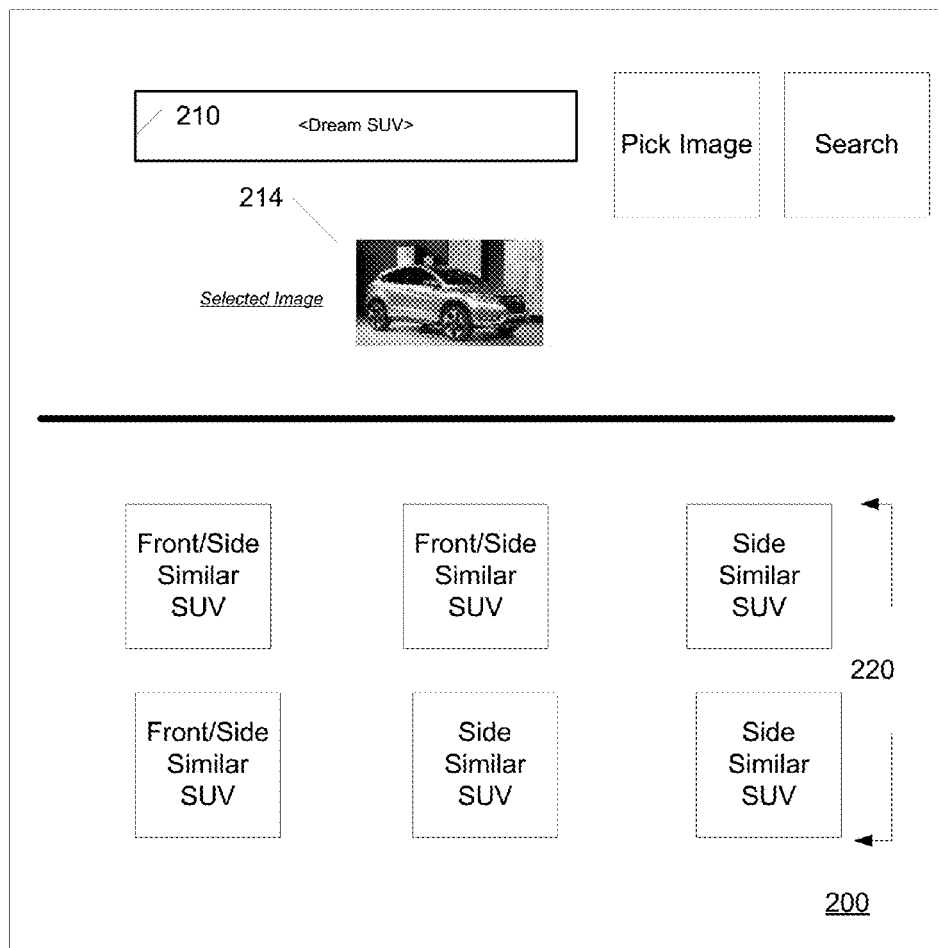
FIG. 2 illustrates an example search user interface, according to one aspect.

FIG. 2 illustrates an example search user interface, according to one aspect. The example search user interface can be provided as part of search system 100 (see FIG. 1). For example, an example search user interface of FIG. 2 can be provided through operation of the interface 110. In the example of FIG. 2, an interface 200 includes input features 210 for enabling the user to generate a query that specifies an input image 214. For example, the features 210 may enable the user to upload an input image from the user's own computer. As another example, the features 210 may enable the user to specify an input image from an online account or resource.

The user can interface with the interface 200 in order to initiate a search query that is based on the input image 214. A system such as described with FIG. 1 can be used to generate a search result 220. The search result 220 can include multiple content items that include an image which is determined to have a sufficiently high affinity to the input image 214 to be deemed a match. As provided by system 100, and described with various examples, the items of the search result 220 can be determined in part using object detection that incorporates deformable parts model analysis. In some examples, object detection processes can analyze the input image 214 and/or indexed content with training that incorporates deformable parts model analysis with latent SVM. For results, examples provide that the items of the result 220 can be matched to the input image so that they carry generally the same viewpoint and the same subclass, e.g., subclass of SUV for vehicle search.

Further, as described by various examples, object detection can be performed on the input image 214 and/or the indexed images in a manner that enables the search to be made substantially specific to the same object subclass and/or perspective. In contrast, many conventional approaches perform object detection using metrics such as aspect ratio rather than parts-based affinity. The use of metrics such as object aspect ratio is less reliable than, for example, enabling image-based search operations which compare objects by subclass and perspective, as metrics such as aspect ratio typically cannot distinguish amongst many possible perspectives and/or object subclasses.

Methodology

Figure 3:
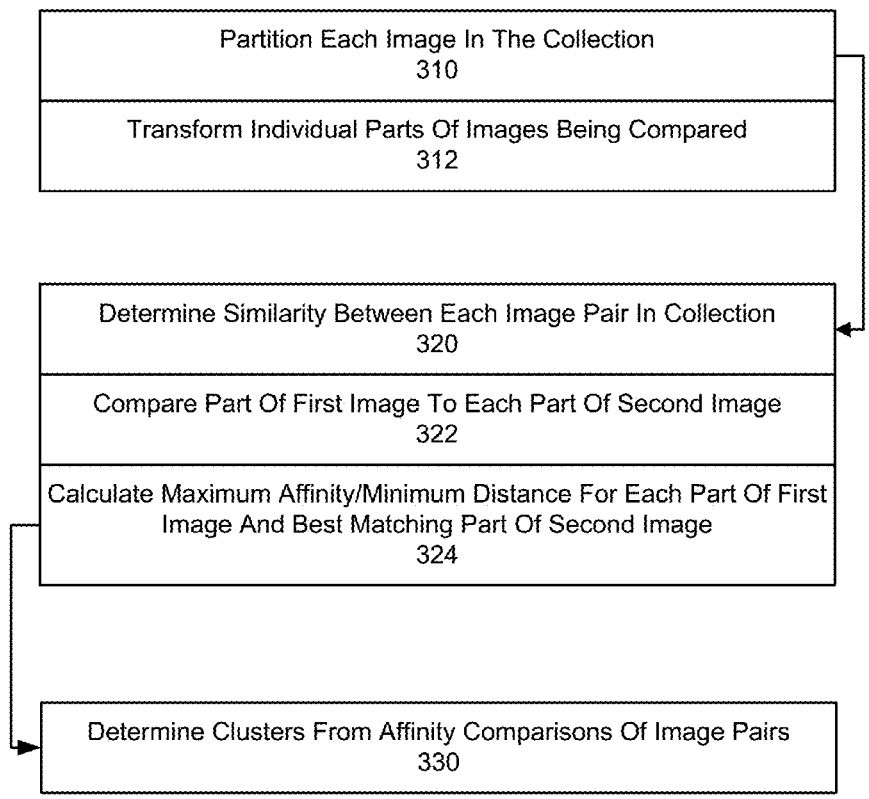
FIG. 3 illustrates an example method for determining image similarity amongst a pair of images based on a deformable parts model analysis.
Figure 4:
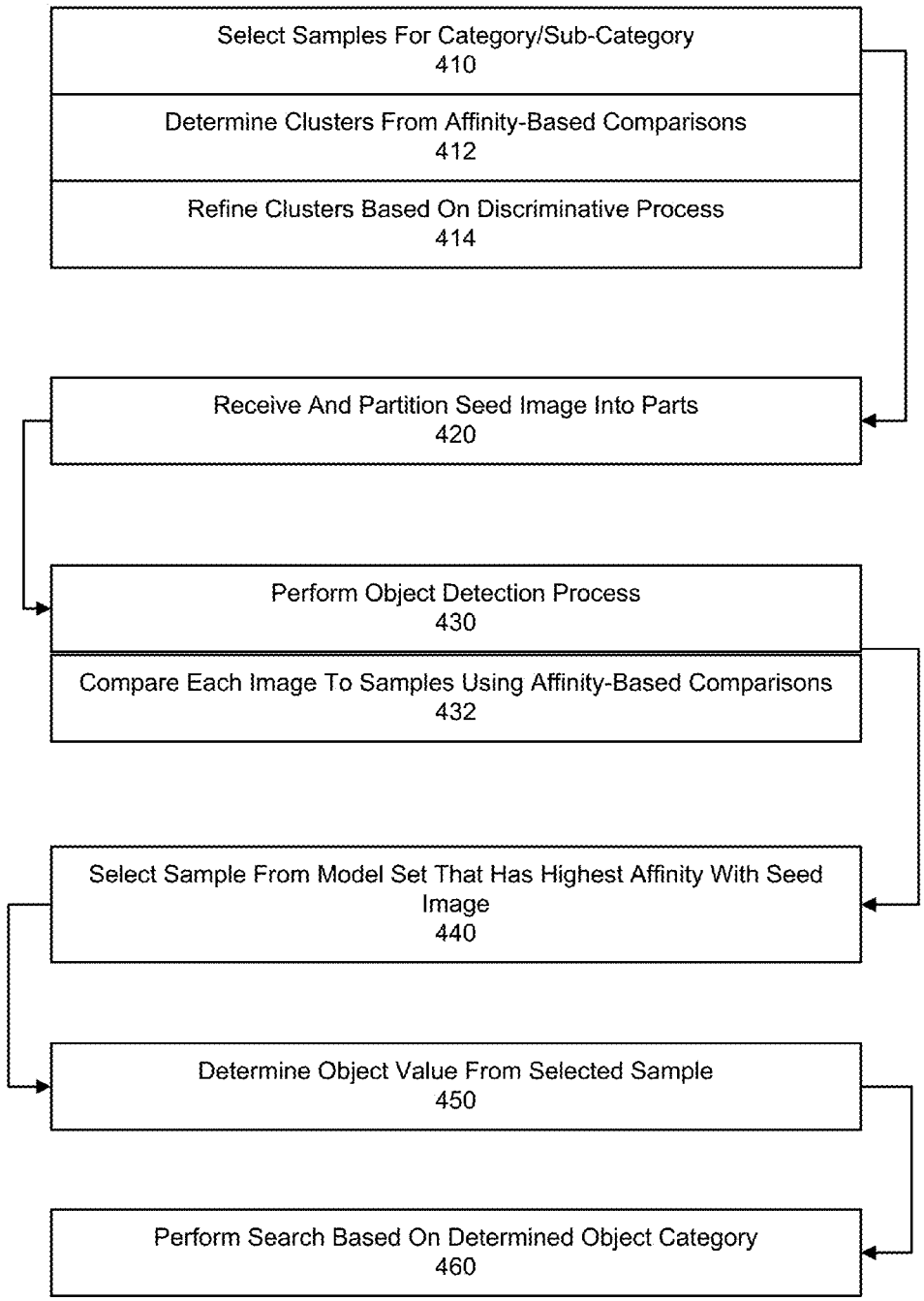
FIG. 4 illustrates an example method for performing a search operation using an object value determined from a deformable parts model analysis of a seed image.
Figure 5:
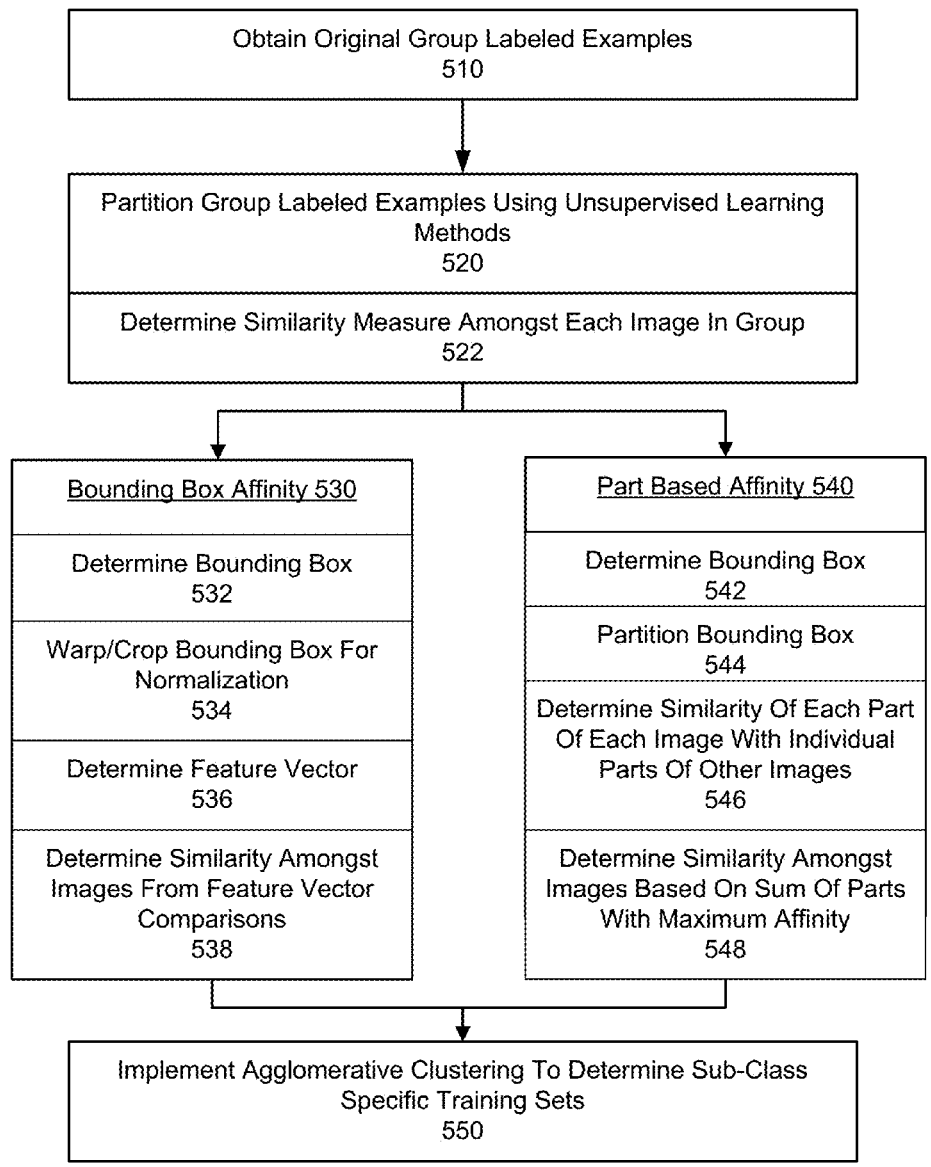
FIG. 5 illustrates an example method for determining training sets for object detection, according to another example.

FIG. 3 illustrates an example method for clustering a collection of images based on affinity comparisons amongst individual images in the collection of images. FIG. 4 illustrates an example method for performing a search operation using an object value determined from a deformable parts model analysis of a seed image. FIG. 5 illustrates an example method for determining training sets for object detection, according to another example. In describing examples such as provided by FIG. 3, FIG. 4 and FIG. 5, reference may be made to elements of FIG. 1 for purpose of illustrating suitable elements or components for performing a step or sub step being described.

With reference to FIG. 3, each image in a collection is partitioned (310). For example, a bounding box is defined for each image, and each image is subsequently partitioned into parts. In some implementations, the bounding box for each image may be positioned centrally in the image, so as to occupy a majority of the image. Each part may correspond to a region of the corresponding image.

The partitioning of the parts can further be subjected to transformations (312). For example, some or all parts of each image can be subjected to a transformation that modifies the part in some way as compared to the original state. By way of example, the transformation functions can include warping, resizing, scaling, rotating, or translating an individual part. In some variations, different transformations can be performed for different regions of an image. Thus, the transformations to the parts of an image do not need to be uniform, but can vary in both degree and kind. Furthermore, more than one transformation can be performed on a given image part.

Similarity is then determined as between each image pair in the collection (320). Specifically, each image in the collection is compared to every other image in the collection. To determine similarity between each image pair, one implementation provides that each part of a first image of the pair is compared to a set of multiple parts of a second image of the pair (322). Specifically, a distance measure can be determined between each part of the first image of the pair and each of multiple parts of the second image of the pair. The distance measure can be based on a distance function, such as a Euclidean distance function. For example, for a given part of the first image, a distance measure may be determined as between that part and each and every part of the second image, and this determination may be repeated for each and every other part of the first image. Alternatively, a distance measure may be determined as between a given part of the first image of the pair and each part in a subset of parts of the second image of the pair. For example, the given part of the first image may be situated in a given quadrant of the image, and the part may be compared to only those parts of the second image that are in a corresponding quadrant.

In determining the distance measure between each image pair in the collection, a feature representation of each part may be determined. For example, respective distance functions for each part can be based on a histogram of oriented gradient (HOG) for the part. In variations, other feature representations for the individual parts can also be used. In particular, other feature representations can also be used in determining part-specific distance functions, such as scale-invariant feature transform (SIFT), feature vectors, bag of words, and fisher kernels.

For each image pair in the collection, a maximum affinity for each part of the first image is determined (324). For each part of the first image, the maximum affinity is provided by a corresponding part of the second image which has the highest affinity measure. For example, the maximum affinity can be provided by the corresponding part that has the smallest distance measure.

The similarities that are determined between the first and second image of each image pair can be based on the maximum affinity determination for each part of the first image. Thus, the similarity between the first image and the second image of an image pair depends on, for example, the distance measure between each part of the first image and the specific part of the second image that has the most affinity to that part of the first image. When determined from a Euclidean distance function, the similarity between the first and second image of the image pair is determined from the sum of the distance measure between each part of the first image and the part of the second image that provides the smallest Euclidean distance measure, as compared to the other parts of the second image. Thus, the distance measure between image parts can be determined from the determined quantitative measure. The degree of affinity between compared image parts can correlate inversely to the distance measure between the compared image parts. The maximum affinity of each part of the seed image 112 corresponds to the highest affinity that part has with any compared part of the sample being compared.

Based on the similarity determination between each image pair of the collection, clusters of images can be identified based on a degree of affinity as between individual images of the collection (330). The number of clusters that are identified from the affinity comparisons of the image pairs can be based on, for example, a threshold metric that defines acceptable similarity as between images within a cluster.

With reference to FIG. 4, samples for performing object detection are selected from a collection of images (410). As described with an example of FIG. 3, the sample selection can be based on clustering the samples into models or sample sets. The clustering can be based on affinity comparisons of individual samples within the collection (412). Additionally, once the samples are clustered, each cluster can further be refined based on, for example, a discriminative training process where positive and negative examples are incorporated as part of the models (414).

With an image search system such as described with an example of FIG. 1, a seed image is received and partitioned into parts (420). For example, as described with FIG. 1, the seed image 112 can be received from user input, or by way of programmatic extraction identification. In partitioning the seed image, a bounding box may be determined for the seed image. The bounding box can be cropped or otherwise sized in order to be comparable in dimension with those of other images. Each partition can be determined at a fine resolution, such as to twice the normal resolution, and each part can be compared to multiple parts of any sample based on a design metric in which that part is allowed to "move" a nontrivial amount. Thus for example, each part of the seed image can be compared to any part of a given sample. Alternatively, each part of the seed image can be compared to a part in a given sample that is in a region, e.g., quadrant or other measure, of the sample that corresponds to a region where that part is located in the seed image.

An object detection process can be performed on the seed image 112 using the determined sample sets or models (430). In some implementations, the seed image 112 may be compared to each sample in a model set using an affinity-based comparison (432). In performing this comparison, one example includes performing a deformable parts model analysis. As described with an example of FIG. 3, the deformable parts model analysis can be based on a distance measure as between the image parts being compared.

In one implementation, sample from the model that has the highest affinity with the seed image is selected (440). The sample with the highest affinity is determined from the totality of the maximum affinity between each part of the seed image and each sample. For example, in one implementation, the sample with the highest affinity is determined from the summation of the maximum affinity of each part of the seed image in relation to that sample.

An object value can be determined from the select sample (450). The object value can identify a subclass of an object depicted in the seed image, as well as perspectives in which that object are depicted. For example, for the class of objects corresponding to vehicles, the subclass can identify vehicles by type, such as truck, sedan, sports car or hatchback. The model can include samples of each subclass, and further include perspectives for each subclass. The model can include a total number of sets for each combination of perspective and subclass. Thus, each set of the model can correspond to a subclass and a perspective. For example, with vehicles, the perspective can include one of six possible viewpoints from which a picture of the vehicle is typically captured and displayed. Perspectives for vehicles can include, for example, driver-side view, passenger-side view, front perspective, rear perspective, driver-side perspective, and front passenger side perspective.

In some implementations, the object value can be used to formulate a search criterion for use in performing search operations. For example, search operations can be performed to retrieve content that includes images which are visually similar to the object detected from the seed image. In some variations, additional recognition processes can be performed to identify recognition information from the seed image. The recognition processes can optionally use the object value in determining the recognition information. The search criterion can incorporate recognition information, as well as the object value in performing search operations. Other information, such as metadata extracted from the seed image, can also be used in formulating the search criterion.

With reference to FIG. 5, a labeled group of examples may be obtained (510). The labeling may originate from a variety of sources, such as manual input or search parameters. The group may represent images from a class or subclass of objects, such as vehicles or shoes, or subclasses thereof.

The group may be programmatically partitioned based on affinity, using unsupervised learning methods (520). This is in contrast to conventional approaches, which partition training data based on similarity of aspect ratios. Examples described herein recognize that metrics such as aspect ratio determination are actually relatively inferior points of comparison, unless the granularity in the subgroups of the labeled group is large. However, such large granularity impedes training with use of affinity comparisons amongst training images. For example, deformable parts model analysis can be computationally expensive or impractical unless the labeled group includes finer granular sub-divisions. In contrast, an example of FIG. 5 enables programmatic division of a labeled group based on affinity comparisons.

In some implementations, the unsupervised learning methods may be based on determining similarity measures amongst each image in the group (522). For example, a matrix may be developed that establishes similarity between each and every image in the group.

In one implementation, the similarity amongst images in the group is determined from a bounding box affinity approach (530). This is an alternative or variation, the similarity amongst images in the group may be determined from a part based affinity approach (540).

In the bounding box affinity approach, a bounding box is determined for each image in the group (532). The bounding box can be located centrally in the image, and occupy a majority of the image. The bounding box may be warped and/or cropped to normalize the bounding box as compared to other images in the group (534). A feature vectors determined for each image as provided in the respective bounding box (536). The similarity is determined amongst each image based on feature vector comparisons of the respective images (538).

In the part based affinity approach, the bounding box is determined for each image (542). Optionally, each bounding box can be cropped and/or warped. The bounding boxes of each image may then be partitioned (544), and the granularity of the partitions may be specified by design parameters. In determining affinity amongst pairs of images, a distance measure may be determined between each part of an image in the pair and multiple or all parts of the other image in the pair (546). As described with an example of FIG. 3, the similarity between the images in the pair is based on the parts of the image pair that have the highest affinity with one another. More specifically, the similarity measure may be based on the distance measure between each part of the first image in the pair and the most similar part of the other image in the pair (548). The part based image pair calculation may be repeated so that similarity measures are determined for each image pair in the group.

An agglomerative clustering process may be implemented to determine subclass specific training sets (550). In one implementation, the affinity matrix as determined by the subprocess of (540) is used as input to cluster the images in the group into a hierarchy of clusters, where each cluster represents a model from which samples for deformable parts analysis can be implemented. Examples recognize that the selection of the number of clusters can be optimized at the cost of generalization error. This generalization error is a theoretical estimation of the learned capacity of an object detection process, such as provided by the object detector 130 in an example of FIG. 1. In the context of examples provided herein, the generalization error can be expressed as:

$$e(K) = \operatorname{sum}\_k\{\operatorname{sum}\_i\hat{\ }n\{(d(x\_\{ik\}, c\hat{\ }\_\_k)\}\}$$

where k is the current model order and is equal to the number of clusters, i is a given training image, n is the total number of points in a given cluster k, and $c\hat{\ }\_\_k$ is the center of mass of the given cluster k. The distance measure from each point in the cluster K from the center of mass does provide the basis for the generalization error. As K approaches N, where N is the total number of samples, the generalization error will go to zero.

Figures 6A, 6B, 6C:
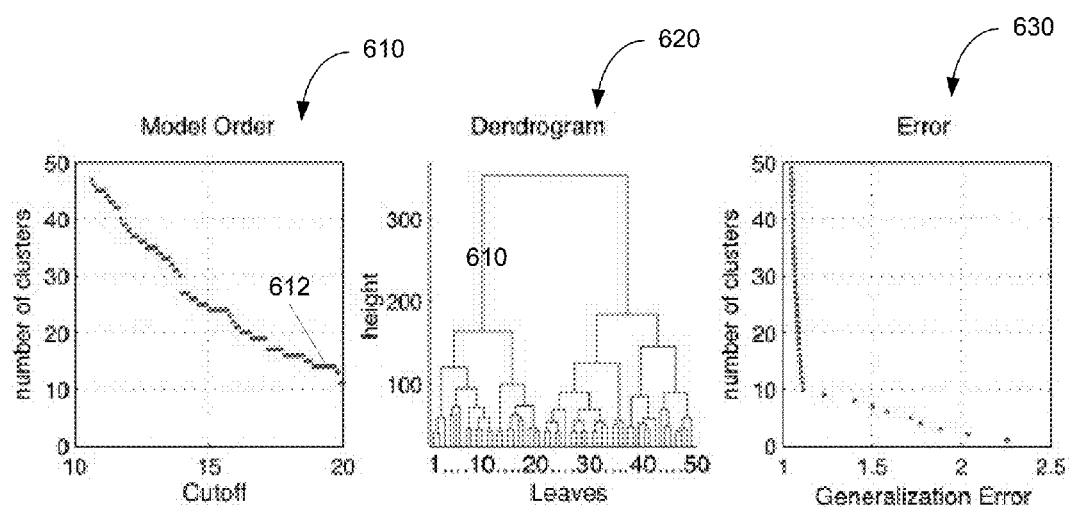
FIG. 6A illustrates distribution of samples for a given number of clusters, given examples from a labeled group.
FIG. 6B illustrates a dendrogram that depicts the clusters identified in identified clusters in hierarchical fashion.
FIG. 6C illustrates a metric for the generalization error, given a number of clusters that are selected for the labeled group.

FIG. 6A through FIG. 6C illustrate an example of agglomerative clustering to determine model order, as well as the constituent training images of each model, given a group of labeled examples. FIG. 6A illustrates distribution of samples for a given number of clusters from a labeled group. In the graph 610 of FIG. 6A, the vertical axis represents the number of clusters, and the horizontal axis represents the number of examples that would be present for a given cluster number, assuming the product of the number of clusters and the number of examples in each cluster total the number of examples in this group of labeled examples. In one implementation, the model order K can be selected from a number of clusters that correspond with the largest "flat" region 612. If multiple equal regions exist in the graph 610, then the region corresponding to the smaller K is selected.

FIG. 6B illustrates a dendrogram 620 that depicts the clusters in hierarchical fashion. The horizontal axis of dendrogram 620 represents the number of leaf nodes, which can be equal to the size of the labeled group. The clustering can be visualized by the branches between the leaf nodes. The vertical axis represents the distance measure between nodes and/or clusters. The branches of the nodes can be characterized by their respective height, which can be correlated to the affinity between linked nodes of the branch. Specifically, the smaller the height of the branch, the greater the affinity will be between linked nodes of that branch. Conversely, the greater the height of the branch, the less similarity is deemed to exist between the nodes connected by the branch. In this way, the examples of the labeled group can be assigned to clusters, and each of K deformable part models is trained on the corresponding training samples of a corresponding cluster.

In general, the choice of model order can be based on the model order stability, which is a function of an inconsistency threshold Y. The inconsistency threshold Y can be based on an inconsistency coefficient Z for each link of the dendrogram 620 shown in FIG. 6B. The inconsistency coefficient Z can characterize each link in the cluster tree by comparing the link's height, h, with the average height of other links at the same level of the hierarchy. Each node in the hierarchy can have its own inconsistency coefficient, and the totality of inconsistency coefficients for the hierarchical cluster tree, or levels thereof, can be used to determine the model order stability.

FIG. 6C illustrates a graph for the generalization error, given a number of clusters that are selected for the labeled group. As shown by graph 630, the generalization error is leased to the number of clusters equals to the number of examples in the labeled group, and the model order is inversely proportional to the generalization error.

As described, object detection can be trained with use of deformable parts model analysis. To achieve effective use of deformable parts analysis in object detection, individual models that include training samples are identified programmatically as subclasses of a labeled group. The affinity-based determination of samples for the individual models enables better training and use of object detection processes.

Computer System

Examples described herein provide that methods, techniques and actions performed by a computing device are performed programmatically, or as a computer-implemented method. Programmatically means through the use of code, or computer-executable instructions. A programmatically performed step may or may not be automatic.

Examples described herein may be implemented using programmatic modules or components. A programmatic module or component may include a program, a subroutine, a portion of a program, or a software component or a hardware component capable of performing stated tasks or functions. As used herein, a module or component can exist on a hardware component independently of other modules or components. Alternatively, a module or component can be a shared element or process of other modules, programs or machines.

Furthermore, examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples include processor(s) and various forms of memory for holding data and instructions. Examples of computer-readable mediums include permanent memory storage devices, such as hard drives on personal computers or servers.

Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 7:
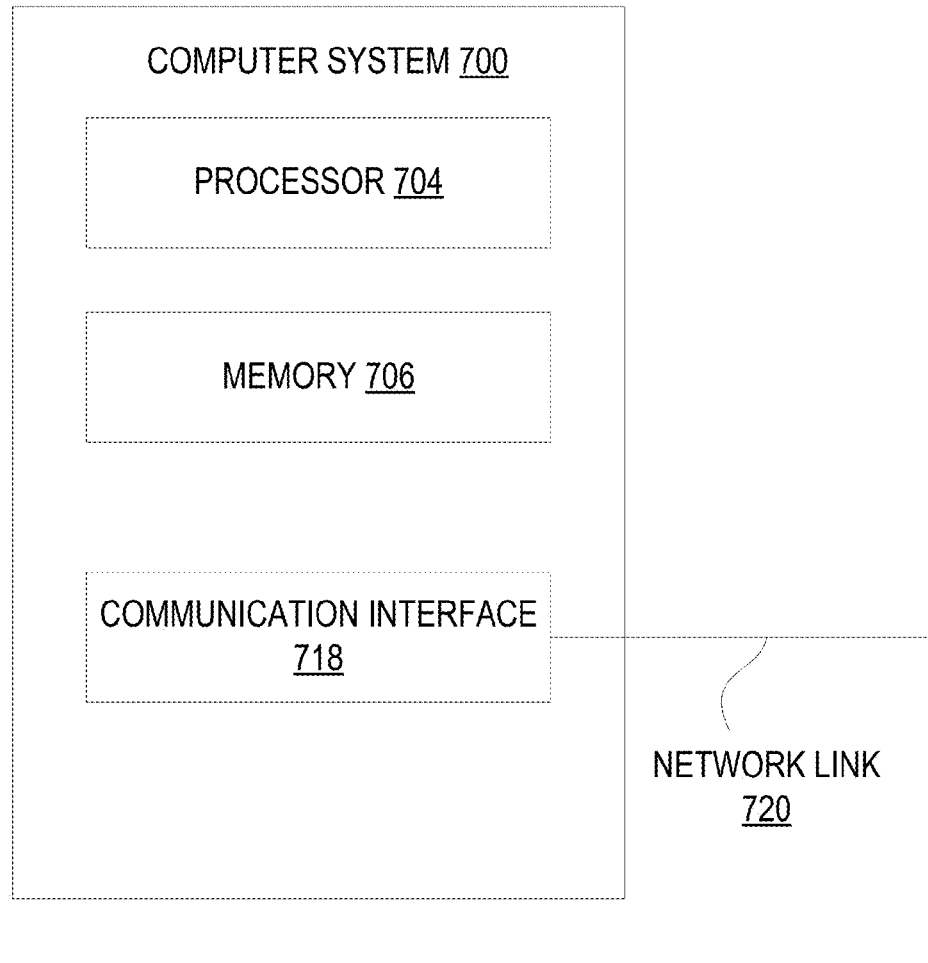
FIG. 7 is a block diagram that illustrates a computer system upon which aspects described herein may be implemented.

FIG. 7 is a block diagram that illustrates a computer system upon which aspects described herein may be implemented. For example, in the context of FIG. 1, search system 100 may be implemented in part using a computer system such as described by FIG. 7.

In one implementation, computer system 700 includes processor 704, memory 706 (including non-transitory memory), and communication interface 718. Computer system 700 includes at least one processor 704 for processing information. Computer system 700 also includes a memory 706, such as a random access memory (RAM) or dynamic storage device, for storing information and instructions to be executed by processor 704. The memory 706 also may be used for storing temporary variables or other intermediate information during execution of instructions to be executed by processor 704. Computer system 700 may also include a read only memory (ROM) or other static storage device for storing static information and instructions for processor 704. The communication interface 718 may enable the computer system 700 to communicate with a network, or a combination of networks, through use of the network link 720 (wireless or wireline).

Examples described herein are related to the use of computer system 700 for implementing the techniques described herein. According to one aspect, those techniques are performed by computer system 700 in response to processor 704 executing one or more sequences of instructions contained in memory 706. Such instructions may be read into memory 706 from another machine-readable medium, such as storage device 710. Execution of the sequences of instructions contained in memory 706 causes processor 704 to perform the process steps described herein. In alternative implementations, hard-wired circuitry may be used in place of or in combination with software instructions to implement examples such as described herein. Thus, examples as described are not limited to any specific combination of hardware circuitry and software.

Although illustrative examples have been described in detail herein with reference to the accompanying drawings, variations to specific aspects and details are encompassed by this disclosure. It is intended that the scope described herein can be defined by claims and their equivalents. Furthermore, it is contemplated that a particular feature described, either individually or as part of an example, can be combined with other individually described features, or parts of other examples. Thus, absence of describing combinations should not preclude the rights to such combinations.

What is claimed is:

1. A computer-implemented method comprising:
   receiving a collection of images representative of a class;
   computing a respective part-based affinity between each pair of images in the collection of images, including:
      partitioning a first image of the pair of images into a plurality of partitions;
      determining a respective affinity for each partition of the first image, wherein the affinity is based at least in part on a measure of similarity between the partition and a location in a second image of the pair of images having a highest measure of similarity with the partition of the first image;

determining a part-based affinity between the first image and the second image based at least in part on a sum of the respective affinities of the plurality of partitions of the first image with corresponding locations in the second image;

generating a plurality of clusters of the images in the collection of images, wherein the plurality of clusters of images are based on the respective determined part-based affinities between each pair of images in the collection of images;

selecting images in each cluster as being representative of a particular subclass of a plurality of subclasses of the class; and training a respective deformable parts model using images selected for each of the plurality of subclasses.

2. The method of claim 1, wherein partitioning a first image of the pair of images into a plurality of partitions comprises:

determining a bounding box within the first image, wherein the bounding box designates an object region within the image; and partitioning the bounding box in the first image into a plurality of partitions.

3. The method of claim 2, wherein determining a part-based affinity between the first image and the second image based at least in part on a sum of the respective affinities of the plurality of partitions of the first image with corresponding locations in the second image comprises determining respective affinities of the plurality of partitions within the bounding box of the first image with corresponding locations in the second image.

4. The method of claim 1, wherein determining a respective affinity for each partition of the first image comprises:

determining a corresponding partition of the second image for the partition of the first image; and determining the measure of similarity between the partition of the first image and a location in the second image, the location in the second image being located within the corresponding partition of the second image.

5. The method of claim 1, wherein determining a respective affinity for each partition of the first image comprises determining a measure of similarity between the partition of the first image and a location in the second image using a partition-specific distance function.

6. The method of claim 1, wherein generating a plurality of clusters comprises:

computing a respective generalization error for each of a number of model orders i, wherein the model order i specifies a maximum number of clusters to generate from the images in the collection of images; and selecting a model order i having a generalization error that satisfies a threshold.

7. A system comprising:

one or more computers and one or more storage devices storing instructions that are operable, when executed by the one or more computers, to cause the one or more computers to perform operations comprising:

receiving a collection of images representative of a class;

computing a respective part-based affinity between each pair of images in the collection of images, including:

partitioning a first image of the pair of images into a plurality of partitions;

determining a respective affinity for each partition of the first image, wherein the affinity is based at least in part on a measure of similarity between the partition and a location in a second image of the pair of images having a highest measure of similarity with the partition of the first image;

determining a part-based affinity between the first image and the second image based at least in part on a sum of the respective affinities of the plurality of partitions of the first image with corresponding locations in the second image;

generating a plurality of clusters of the images in the collection of images, wherein the plurality of clusters of images are based on the respective determined part-based affinities between each pair of images in the collection of images;

selecting images in each cluster as being representative of a particular subclass of a plurality of subclasses of the class; and training a respective deformable parts model using images selected for each of the plurality of subclasses.

8. The system of claim 7, wherein partitioning a first image of the pair of images into a plurality of partitions comprises:

determining a bounding box within the first image, wherein the bounding box designates an object region within the image; and partitioning the bounding box in the first image into a plurality of partitions.

9. The system of claim 8, wherein determining a part-based affinity between the first image and the second image based at least in part on a sum of the respective affinities of the plurality of partitions of the first image with corresponding locations in the second image comprises determining respective affinities of the plurality of partitions within the bounding box of the first image with corresponding locations in the second image.

10. The system of claim 7, wherein determining a respective affinity for each partition of the first image comprises:

determining a corresponding partition of the second image for the partition of the first image; and determining the measure of similarity between the partition of the first image and a location in the second image, the location in the second image being located within the corresponding partition of the second image.

11. The system of claim 7, wherein determining a respective affinity for each partition of the first image comprises determining a measure of similarity between the partition of the first image and a location in the second image using a partition-specific distance function.

12. The system of claim 7, wherein generating a plurality of clusters comprises:

computing a respective generalization error for each of a number of model orders i, wherein the model order i specifies a maximum number of clusters to generate from the images in the collection of images; and selecting a model order i having a generalization error that satisfies a threshold.

13. A computer program product, encoded on one or more non-transitory computer storage media, comprising instructions that when executed by one or more computers cause the one or more computers to perform operations comprising:

receiving a collection of images representative of a class;

computing a respective part-based affinity between each pair of images in the collection of images, including:

partitioning a first image of the pair of images into a plurality of partitions;

determining a respective affinity for each partition of the first image, wherein the affinity is based at least in part on a measure of similarity between the partition and a location in a second image of the pair of images having a highest measure of similarity with the partition of the first image;

determining a part-based affinity between the first image and the second image based at least in part on a sum of the respective affinities of the plurality of partitions of the first image with corresponding locations in the second image;

generating a plurality of clusters of the images in the collection of images, wherein the plurality of clusters of images are based on the respective determined part-based affinities between each pair of images in the collection of images;

selecting images in each cluster as being representative of a particular subclass of a plurality of subclasses of the class; and training a respective deformable parts model using images selected for each of the plurality of subclasses.

14. The computer program product of claim 13, wherein partitioning a first image of the pair of images into a plurality of partitions comprises:

determining a bounding box within the first image, wherein the bounding box designates an object region within the image; and partitioning the bounding box in the first image into a plurality of partitions.

15. The computer program product of claim 14, wherein determining a part-based affinity between the first image and the second image based at least in part on a sum of the respective affinities of the plurality of partitions of the first image with corresponding locations in the second image comprises determining respective affinities of the plurality of partitions within the bounding box of the first image with corresponding locations in the second image.

16. The computer program product of claim 13, wherein determining a respective affinity for each partition of the first image comprises:

determining a corresponding partition of the second image for the partition of the first image; and determining the measure of similarity between the partition of the first image and a location in the second image, the location in the second image being located within the corresponding partition of the second image.

17. The computer program product of claim 13, wherein determining a respective affinity for each partition of the first image comprises determining a measure of similarity between the partition of the first image and a location in the second image using a partition-specific distance function.

18. The computer program product of claim 13, wherein generating a plurality of clusters comprises:

computing a respective generalization error for each of a number of model orders i, wherein the model order i specifies a maximum number of clusters to generate from the images in the collection of images; and selecting a model order i having a generalization error that satisfies a threshold.

* * * * *